United States Patent [19]

Feldkirchner et al.

[11] Patent Number: 4,663,046

[45] Date of Patent: May 5, 1987

[54] SYSTEM TO CLEAR PARTICLES FROM OUTLET IN ACTIVATED SLUDGE PROCESS

[75] Inventors: Heinz Feldkirchner, Starnberg; Hans-Peter Riquarts, Pullach, both of Fed. Rep. of Germany

[73] Assignee: Linde Aktiengesellschaft, Wiesbaden, Fed. Rep. of Germany

[21] Appl. No.: 732,545

[22] Filed: May 10, 1985

[30] Foreign Application Priority Data

May 11, 1984 [DE] Fed. Rep. of Germany ........ 3417550

[51] Int. Cl.⁴ .............................................. C02F 3/08
[52] U.S. Cl. .................................. 210/616; 210/620; 210/629
[58] Field of Search .............. 210/616–618, 210/626–628, 620, 150, 151, 629

[56] References Cited

U.S. PATENT DOCUMENTS

| | | | |
|---|---|---|---|
| 2,017,591 | 2/1937 | Tholin | 210/616 |
| 4,179,366 | 12/1979 | Kaelin | 210/620 |
| 4,206,047 | 6/1980 | Mandt | 210/627 |
| 4,415,451 | 11/1983 | Suzuki | 210/616 |
| 4,430,224 | 2/1984 | Fuchs | 210/627 |
| 4,521,311 | 6/1985 | Fuchs et al. | 210/616 |
| 4,566,971 | 1/1986 | Reimann et al. | 210/616 |

FOREIGN PATENT DOCUMENTS

| | | | |
|---|---|---|---|
| 106043 | 4/1984 | European Pat. Off. | 210/620 |
| 3104036 | 12/1981 | Fed. Rep. of Germany | 210/616 |
| 3225717 | 1/1984 | Fed. Rep. of Germany | 210/620 |
| 3327560 | 2/1985 | Fed. Rep. of Germany | 210/620 |

*Primary Examiner*—Benoit Castel
*Attorney, Agent, or Firm*—Millen & White

[57] ABSTRACT

In an activated sludge process for the purification of wastewater, in a completely mixed tank in the presence of carrier particles for the microorganisms, the aerating gas feed creates a tubular spiral circulating flow of the wastewater about a horizontal axis extending from the inlet zone to the outlet zone of the tank. To avoid a buildup of the carrier particles in the outlet zone of the tank, the gas feed maintaining the circulating motion is reduced along the axis of flow with respect to the gas feed set in the initial zone of the flow path. Gas may also be sparged along an axis transverse to the flow near the outlet to create a tubular flow which also clears the carrier particles from the outlet.

15 Claims, 1 Drawing Figure

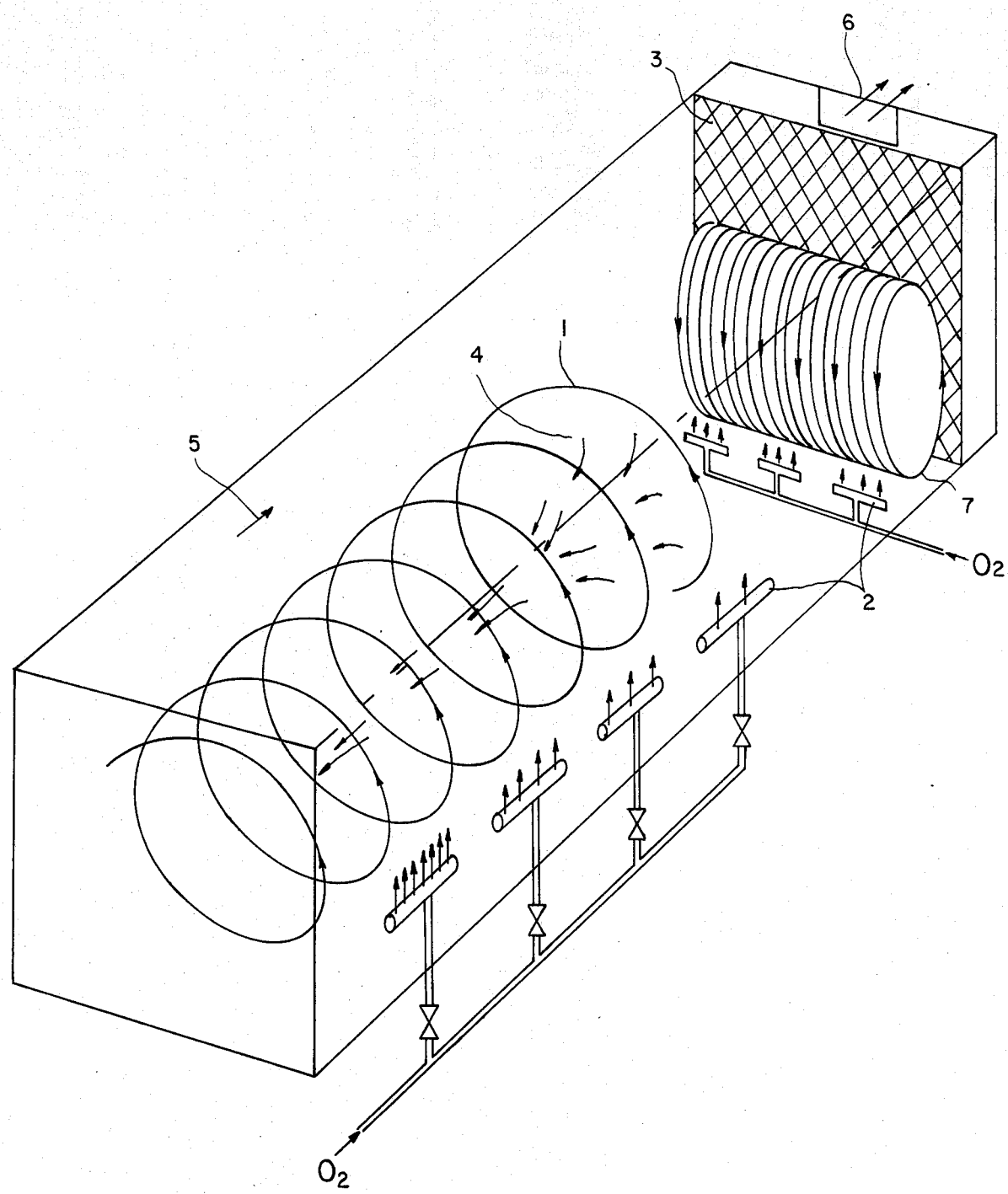

SYSTEM TO CLEAR PARTICLES FROM OUTLET IN ACTIVATED SLUDGE PROCESS

BACKGROUND OF THE INVENTION

This invention relates to a secondary treatment process for the biological purification of wastewater wherein the wastewater is aerated with an oxygen-containing gas in a completely mixed tank in the presence of carrier particles for aerobic microorganisms and in particular wherein the gas feed produces a circulating flow of the wastewater about a horizontal axis extending from the inlet zone to the outlet zone of the tank.

The completely mixed tank is oblong in shape, whereby there is a preferred ratio length: width greater than 3:1, most preferably greater than 5:1.

As is known, with the use of freely suspended carrier particles as the settling substrate for microorganisms, the biomass concentration can be substantially increased even in activated sludge plants, and in this way rapid degradation of waste materials present in the wastewater can be achieved. In this connection, use has recently been made of open-cell foam particles as the carrier particles wherein the specific gravity, the size, and the macropores of these particles are so selected that for a higher rate of mass transfer, the foam particles in the oxygenation tank can be circulated upwardly and downwardly by virtue of the prevailing current and aeration.

One disadvantage however, in operating an aeration tank with the use of such carrier particles is that, with the flow of the wastewater-activated sludge mixture oriented toward the outlet of the aeration tank, entrainment of the carrier particles toward the outlet zone will gradually occur. Thereby a buildup in the concentration of carrier particles occurs at the outlet, the latter usually being equipped with a screen or perforated plate or the like for retaining the carrier particles. As a consequence, in the course of time, the carrier particles will not only clog the outlet but also will no longer be available in a sufficient quantity in the inlet zone of the aeration tank where a high biomass concentration is desirable.

SUMMARY OF THE INVENTION

An object of this invention is to provide an improved process of the type discussed above so as to avoid the buildup of the carrier particles, freely floating in the wastewater-activated sludge mixture, in the outlet zone of the tank, and the resultant clogging of the outlet.

Upon further study of the specification and appended claims, further objects and advantages of this invention will become apparent to those skilled in the art.

To attain these objects, the improved process provides that the gas feed is regulated so as to prevent the carrier buildup at the outlet. To accomplish this regulation, for example, the gas feed maintaining the circulating motion is reduced with respect to the gas feed set in the initial zone of the flow path, at least in the zone of the last third of the flow path and at least in case of a carrier particle concentration in this zone lying above the carrier particle concentration present in the inital zone.

The carrier in the context of this invention is meant to include all types of carrier materials having a density not much different from that of water.

The invention is based on the surprising fact that carrier particles suspended in the wastewater will be transported, in the case of adjacent zones of wastewater treated with different amounts of gas, along the common horizontal axis of circulation, from the section activated by lower amounts of gas to the section activated by higher amounts of gas. As a consequence, assuming a spiralshaped tubular flow common to wastewater, for example in an elongated rectangular tank, the carrier material is actually transported counter to the wastewater flow oriented toward the outlet zone so long as the gas feed along the wastewater flow path from inlet to outlet is reduced.

Reduction of the gas feed can be effected so that, with a carrier particle concentration in the last third of the flow path lying above the carrier particle concentration in the inital zone of the flow path, the gas feed in the last third is temporarily shut off until the carrier particle concentration, by return transport of the carrier particles, has dropped below the carrier particle concentration present in the initial zone. Subsequently the gas feed can be resumed. If then, the carrier particle concentration in the last third of the flow path is eventually increased above the carrier particle concentration of the inlet zone, the procedure must be repeated.

However, instead of such an intermittent gas feed in the last third of the tank, there is also the possibility of merely reducing the gas feed in the last third as compared with the gas feed in the initial zone of the flow path. Reduction of the gas feed can be effected in this case either continuously or intermittently. The selection of the particular use of gas feed in the last third will depend in each instance on the prevailing carrier particle concentration and the oxygen demand of the wastewater required in this zone. With an accumulation of the carrier particles at the outlet, reduction of the oxygen content to below the required value must in some circumstances be tolerated for a short period of time in order to ensure return transport of the carrier particles to the inlet zone counter to the wastewater current oriented toward the outlet zone.

The improved process of this invention thus provides a substantially uniform distribution of the carrier particles over the flow path of the wastewater in the tank without the need for additional, mechanical or pneumatic reconveying means for the carrier particles. This is a noteworthy advantage not only with respect to investment costs but also with respect to operating costs. In particular, little, if any, additional energy input is required.

An advantageous embodiment of the process of this invention resides in effecting reduction of the gas feed in the region of the last third of the flow path to 20–70%, preferably to 25–50%, of the gas feed set in the initial or feeding zone of the flow path. By initial or feeding zone, in the context of this invention, is generally meant the zone which the wastewater is fed to. In most cases this zone is the first third of the tank.

It is also advantageous to effect reduction of the gas feed as early as in the region of the second third of the flow path to 50–90%, preferably to 70–90% of the gas feed set in the initial zone of the flow path. In this connection, these gas feed rates can likewise be controlled intermittently as a function of the carrier particle concentration.

If the flow rate of the wastewater through the tank is substantially constant, then it is also advantageous to effect the gas feed reduction in a stepwise procedure. Thus, for example, the gas feed can be set, in the second third of the flow path, to be 90% in the initial zone of the second third, 80% in the middle zone, 70% in the end zone and, in the middle zone of the last third of the flow path to be 60% and in the end zone of the last third to be 50% of the gas feed taking place at the inlet zone of the tank. However, if there is still an accumulation of carrier particles in the outlet zone, the rate of reduction of the gas feed can be made to be even more pronounced, for example in the last third.

If, because of the degree of oxygenation of the wastewater required for the degradation processes, reduction of the gas over the length of the wastewater flow path is not possible to the extent necessary for uniform distribution of the carrier particles, then according to another advantageous embodiment of the invention, aeration is conducted transversely to the flow path of the wastewater in the last third of the tank in the bottom region of the tank, across substantially the entire width of the wastewater flow path. This transvere aeration is spaced sufficiently from the tank outlet to provide the transverse gas feed, a tubular flow about a transverse axis to the outlet flow. By this transverse tubular flow, the carrier particles are kept away from the tank outlet. This transverse tubular flow is especially provided because of reasons of security.

To safely prevent the carrier particles from leaving the tank, it is expedient to arrange a retention means for carrier particles in front of the tank outlet; this means can be designed as a screen, meshwork, or perforated plate. Advantageously, the aeration is effected transversely to the flow path upstream of such a retention means for retaining the carrier particles in front of the tank outlet, and the carrier particles are retained in a region in front of the tank outlet wherein the flow rate in the direction toward the tank outlet is at most 0.1 m/sec. With such a spacing of the retention means in front of the tank outlet, it is ensured that the current oriented in the direction toward the tank outlet will exert only a small force on the carrier particles. For this reason, the retention means is also suitably arranged transversely to the tank outlet over the entire area.

The aeration conducted transversely to the flow path is preferably performed at a spacing in front of the retention means which corresponds to 1 to 1.5 times the liquid level of the tank. Such an arrangement of aeration conducted transversely to the flow path orients the cylindrical flow downwardly directly in front of the retention means. Thereby, vertically downwardly-effective eddies are formed in front of the tank outlet and/or the retention means, shearing off the carrier particles collecting in front of the retention means and conveying the particles downwardly. Subsequently, the carrier particles are transported away from the retention means by the suction of the cylindrical flow.

Improved shear effects are obtained, if according to another embodiment of the idea of this invention, aeration takes place transversely to the flow path at a spacing of at most 1 meter in front of the retention means. With such an aeration, a tubular flow is produced transverse axis with respect to the efflux current, this flow exhibiting an upwardly directed current immediately in front of the retention means. Because in this case aeration is effected directly in front of the retention means, the gas bubbles rising at that location can shear off any carrier particles adhering to the retention means. In some cases, it is even possible in this way to effect cleaning of the retention means from adhering wastewater ingredients. Especially good results for avoiding obstruction of the retention means are achieved if finebubble aeration is conducted transversely to the flow path for example with tube diffusers, the bubbles having a diameter of less than 1.5 mm.

When effecting gas fed by way of aeration transversely to the flow direction, the gas feed must not be set so high that a suction effect is exerted on the carrier particles present in the forward zone of the tank. For this reason, gas fed by way of aeration transversely to the flow path is to be maintained preferably at a lower rate than the gas feed for the circulating flow set in the second third or in the final third of the flow path.

DESCRIPTION OF DRAWING

The attached drawing serves to facilitate an understanding of a preferred embodiment of the invention. Specifically, the parts of the drawing are enumerated as follows: 1 illustrates the longitudinal spiral-shaped tubular flow of the waste water; 2 represents the aeration means; 3 represents the retention means; 4 illustrates a backwards oriented linear flow of the carrier particles; 5 illustrates the direction of the waste water flow; 6 represents the outlet; and 7 illustrates the aeration conducted transverse to the flow oath in a tubular flow.

Without further elaboration, it is believed that one skilled in the art can, using the preceding description, utilize the present invention to its fullest extent.

From the foregoing description, one skilled in the are can easily ascertain the essential characteristics of this invention, and without departing from the spirit and scope thereof, can make various changes and modifications of the invention to adapt it to various usages and conditions.

What is claimed is:

1. In a process for the biological purification of wastewater comprising aerating the wastewater with a gas feed of an oxygen-containing gas in a completely mixed tank in the presence of microorganismcontaining carrier particles, said tank having an inlet, an outlet, means for retaining the carrier particles in front of the tank outlet, and a bottom, said tank further comprising multiple zones therein establishing an elongated flow path, said multiple zones comprising an initial flow path zone adjacent the inlet of the tank; a flow path zone next to the outlet, the later zone comprising one-third of the total elongated flow path; and a bottom zone next to the bottom of the tank and wherein the gas feed creates a spiral tubular flow of the wastewater about a horizontal axis extending from the inlet zone to the outlet zone of the tank, the improvement comprising regulating the gas feed to prevent a buildup of carrier particles at the outlet so that the gas feed is at least reduced with respect to the gas feed set in the initial zone of the flow path, at least in the zone of the last third of the flow path at least during a period when the carrier particle concentration in this zone exceeds the carrier particle concentration present in the initial zone, said reduction of the gas feed in the zone of the last third of the flow path being effected to 20–70% of the gas feed set in the initial zone of the flow path, and said reduction of the gas feed being effected in stages along the axis of wastewater flow.

2. A process according to claim 1 wherein the reduction of the gas feed in the zone of the last third of the flow oath is effected to 25–50% of the gas feed set in the initial zone of the flow path.

3. A process according to claim 2 wherein the reduction of the gas feed in the zone of the second third of the flow path is effected to 50-90% of the gas feed set in the initial zone of the flow path.

4. A process according to claim 3 comprising conducting the aeration in the bottom zone of the tank transversely to the flow path of the wastewater in the last third of the tank said aeration being conducted proximate but spaced from the tank outlet and being conducted across substantially the entire width of the flow path of the wastewater so as to create a tubular flow around an axis transverse to said flow of wastewater.

5. A process according to claim 1 wherein the reduction of the gas feed in the zone of the second third of the flow path is effected to 50-90% of the gas feed set in the initial zone of the flow path.

6. A process according to claim 5 comprising conducting the aeration in the bottom zone of the tank transversely to the flow oath of the wastewater in the last third of the tank said aeration being conducted proximate but spaced from the tank outlet and being conducted across substantially the entire width of the flow path of the wastewater so as to create a tubular flow around an axis transverse to said flow of wastewater.

7. A process according to claim 1 comprising conducting the aeration in the bottom zone of the tank transversely to the flow path of the wastewater in the last third of the tank, said aeration being conducted proximate but spaced from the tank outlet and being conducted across substantially the entire width of the flow path of the wastewater so as to create a tubular flow around an axis transverse to said flow of wastewater.

8. A process according to claim 7, said aeration being effected transversely to the flow path upstream of said retention means said retaining of the carrier paticles being performed in a region in front of the tank outlet wherein the flow rate in the direction toward the tank outlet is not more than 0.1 m/sec.

9. A process according to claim 8 wherein the aeration is conducted at a distance upstream of the retention means corresponding to 1 to 1.5 times the liquid level of the tank.

10. A process according to claim 9 wherein the aeration is conducted at a distance upstream of the retention means of less than 1 meter.

11. A process according to claim 7, wherein said aeration taking place traversely to the flow path of said wastewater is at a spacing of at most 1 meter in front of said tank outlet.

12. A process according to claim 1, wherein said completely mixed tank is oblong in shape having a preferred length to width ratio greater than about 3:1.

13. A process according to claim 1, wherein said microorganism-containing carrier particles have a density substantially similar to that of water.

14. A process according to claim 1, wherein the reduction of the gas in the zone of the last third of the flow path is continuous.

15. A process according to claim 1, wherein the reduction of the gas in the zone of the last third of the flow path is intermittent.

* * * * *